United States Patent
Kawai et al.

(10) Patent No.: US 7,092,367 B2
(45) Date of Patent: *Aug. 15, 2006

(54) DATA TRANSMISSION METHOD, DATA TRANSMITTER, DATA RECEIVER, DATA RECEPTION METHOD AND DATA TRANSMISSION AND RECEPTION SYSTEM

(75) Inventors: Eiji Kawai, Tokyo (JP); Takeshi Ito, Tokyo (JP); Masaharu Yoshimori, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 48 days.

This patent is subject to a terminal disclaimer.

(21) Appl. No.: 10/858,176

(22) Filed: Jun. 1, 2004

(65) Prior Publication Data

US 2004/0233861 A1 Nov. 25, 2004

Related U.S. Application Data

(63) Continuation of application No. 09/364,585, filed on Jul. 30, 1999, now abandoned.

(30) Foreign Application Priority Data

Jul. 31, 1998 (JP) ................................ P10-218297

(51) Int. Cl.
*H04Q 1/00* (2006.01)
(52) U.S. Cl. .................. 370/312; 340/7.45; 386/46
(58) Field of Classification Search ................ 370/312, 370/390; 340/7.45, 7.46; 386/46
See application file for complete search history.

(56) References Cited

U.S. PATENT DOCUMENTS

| | | | |
|---|---|---|---|
| 5,030,948 A | 7/1991 | Rush | |
| 5,508,695 A | 4/1996 | Nelson et al. | |
| 5,539,395 A | 7/1996 | Buss et al. | |
| 5,555,446 A | 9/1996 | Jasinski | |
| 5,705,995 A | 1/1998 | Laflin et al. | |
| 5,929,773 A | 7/1999 | Nelms et al. | |
| 6,614,985 B1 * | 9/2003 | Tokunaka et al. | ............. 386/46 |

FOREIGN PATENT DOCUMENTS

| | | |
|---|---|---|
| EP | 0 622 966 | 11/1994 |
| WO | WO 97/17682 | 5/1997 |
| WO | WO 98/38809 | 9/1998 |

* cited by examiner

*Primary Examiner*—Brian Zimmerman
(74) *Attorney, Agent, or Firm*—Katten Muchin Rosenman LLP

(57) ABSTRACT

A data transmission and reception system and method that make it possible to transmit and receive more types of information without changing the existing communication system include a broadcasting base station which has a subID adding unit, which arranges in the transmission data region the subIDs of the transmission data arranged in the transmission data region, and a transmission processing unit, which performs transmission processing on the transmission data as data transmission cycles. A portable information communication terminal has an input unit, which sets IDs and subIDs, a comparison unit, which has the address information comparison function of comparing the ID arranged in the selection call part and the ID set by the input unit and obtaining the result of the address information comparison, as well as the identification information comparison function of comparing the subID arranged in the transmission data region and the subID set by the input unit and obtaining the result of the identification address comparison, and a data reading unit, which performs reception control on the transmission data based on the address information comparison result and identification information comparison result obtained from the comparison unit.

18 Claims, 10 Drawing Sheets

DATA TRANSMISSION METHOD, DATA TRANSMITTER, DATA RECEIVER, DATA RECEPTION METHOD AND DATA TRANSMISSION AND RECEPTION SYSTEM

CROSS-REFERENCE TO RELATED APPLICATION

The present application is a continuation of and claims priority under 35 USC 120 from U.S. patent application Ser. No. 09/364,585, filed on Jul. 30, 1999, now abandoned.

BACKGROUND OF THE INVENTION

1. Field of the Invention

This invention concerns a data transmission method and data transmitter that transmits data to which address information has been added, a data receiver and data reception method that receives transmission data based on address information, and a data transmission and reception system that adds address information and transmits and receives data.

2. Description of Prior Art

Wireless call systems or radio paging systems (merely referred as a radio paging system, hereinafter) that transmit information input by telephone have long been available. In a radio paging system, a so-called pager is used as an information reception terminal.

In recent years, information broadcast services have become available in which various information is provided using this radio paging system. This information broadcast service makes it possible, for example, to receive on a pager or pager terminal various information such as information about public events or weather forecast information.

A pager receives various information broadcast from various broadcast base stations based on ID information, etc. arranged in the same data frame.

As shown in FIG. 1A, in the format of the data frame used heretofore, the frame consists of 15 groups G1, G2, G3, G4, . . . , G14, G15 as data transmission cycles.

As shown in FIG. 1B, each group consists of synchronization signal 201, address/message discrimination signal 202, multiple selection call signals 203, 204, and a phase compensation signal 205. Here each frame has a period of, for example, 29 seconds.

Synchronization signal 201 is the part for synchronizing the group to which the pager corresponds and belongs and receiving the selection call signal, among said synchronized group, that is addressed to the pager.

As shown in FIG. 1C, selection call signals 203, 204 consist of address signal 211 and message signal 212, and the constituent units of both signals are, for example, error-correcting code word [BCH(31,16)] (Bose-chaudhuri-Hocquenghem code). For example, this selection call signal consists of a total of 155 bits with its content set to 31-bit units and is expressed specifically with an address signal of 61 bits and a message signal of 93 bits.

Address/message discrimination signal 202 shows in code word units how address signal 211 and message signal 212 are lined up within the selection call signal. This allows the pager to efficiently retrieve address signal 211 alone.

Address signal 211 is set to the address that identifies the pager. The address signal 211 consists of unique call numbers that correspond to each pager. The pager distinguishes this address signal 211, and if it confirms that it is its own address signal (hereafter called its self-address), it sounds a tone, decodes the message signal, and displays the content. The self-address is set to be variable.

Phase compensation signal 205 is a signal that is used on the base station side to cause the phase of transmission signals to match between broadcast base stations.

The pager belongs to some one group within the frame, is synchronized by receiving the synchronization signal of the group to which it belongs, and receives a selection call signal within its group. Then, if its self-address is present within the received selection call signal, the pager sounds a tone and displays the content of the message signal.

The address of a pager has been limited physically to a relative small number, such as a maximum of 8. Because of this, the types of information the pager can receive is limited by the number of its self-addresses, making it difficult to handle a wider variety of information.

Different information can be received by rewriting the self-address, but, as may be expected, the number that can be received simultaneously is limited by the number of self-addresses, and if the number of items of information to be received is greater than the number of self-addresses, it becomes necessary to rewrite the self-address frequently. But it is generally not easy or realistic to rewrite the self-address.

Thus the purpose of this invention, which was devised in consideration of the above situation, is to provide a data transmission method and data transmitter, data receiver and data reception method, and data transmission and reception system that make it possible to transmit and receive more types of information without changing the existing communication system.

SUMMARY OF THE INVENTION

It is an object of the present invention to provide a method and a system which would solve the above problems. The data transmission method of this invention arranges transmission data to be transmitted and identification information that shows the identity of said transmission data in a transmission data region, arranges address information consisting of the address to which the transmission data is to be sent in an address information region, arranges the transmission data region and the address information region in a selection call part, and repeatedly transmits, as data transmission cycles, groups in which synchronization information for reading the transmission data and address information is added to the selection call part.

In the data transmission method, besides the address information of said transmission data, identification information is added to the transmission data before it is transmitted.

In order to solve the above problems, the data transmitter of the invention repeatedly does transmission processing of the transmission data, taking as data transmission cycles groups having a selection call part that consists of a transmission data region in which the transmission data to be transmitted is arranged and an address information region in which address information showing the addresses to which said transmission data is to be sent is arranged, and synchronization information for reading said transmission data and address information. To this end, the data transmitter has an identification information arrangement means that arranges in the transmission data region identification information that shows the identity of the transmission data arranged in said transmission data region, and a transmission processing means that performs transmission processing on the transmission data as data transmission cycles.

In the data transmitter having such a composition, identification information indicating the identity of the transmission data arranged in said transmission data region is arranged in the transmission data region by the identification information arrangement means, and transmission is done by the transmission processing means, taking said transmission region as a data transmission cycle.

In making transmissions, this data transmitter adds identification information, as well as, address information for the transmission data, to said transmission data.

In order to solve the above problems, in the data receiver of the present invention, groups that have a selection call part that consists of a transmission data region in which are arranged the transmission data to be transmitted and identification information indicating the identity of said transmission data, and an address information region in which is arranged address information indicating the addresses to which said transmission data is to be sent, and synchronization information for reading said transmission data and address information, come repeatedly transmitted as data transmission cycles. To this end, the data receiver has an address information setting means that sets the address information; an identification information setting means that sets the identification information; a synchronization means that takes synchronization of the groups based on synchronization information in order to obtain the information that is arranged within groups that it belongs to; an address information comparison means that compares the address information arranged in the selection call part and the address information set by the address information setting means and obtains the result of the address information comparison; an identification information comparison means that compares the identification information arranged in the transmission data region and the identification information set by the identification information setting means and obtains the result of the identification information comparison; and a reception control means that performs reception control of the transmission data based on the address information comparison result and the identification information comparison result.

In the data receiver having such a composition, synchronization of groups is taken by the synchronization means based on synchronization information in order to obtain information arranged in the groups to which it belongs. In the data receiver, the address information comparison means compares the address information arranged in the selection call part and the address information set by the address information setting means and obtains the result of the address information comparison, and the identification information comparison means compares the identification information arranged in the transmission data region and the identification information set by the identification information setting means and obtains the result of the identification information comparison. In the data receiver, the reception control means performs reception control on the transmission data based on address information comparison result and the identification information comparison result.

The data receiver receives the transmission data that comes transmitted based on the address information and identification information that is added to the transmission data.

In order to solve the above problems, the data transmission and reception method of this invention receives data in which there come repeatedly transmitted, as data transmission cycles, groups that have a selection call part that consists of a transmission data region in which are arranged the transmission data to be transmitted and identification information indicating the identity of said transmission data, and an address information region in which is arranged address information indicating the addresses to which said transmission data is to be sent, and synchronization information for reading said transmission data and address information. To this end, the data reception method has a synchronization step that takes synchronization of the groups based on synchronization information in order to obtain the information that is arranged within groups that it belongs to; an address information comparison step that compares the address information arranged in the selection call part and the preset address information and obtains the result of the address information comparison; an identification information comparison step that compares the identification information arranged in the transmission data region and the preset identification information and obtains the result of the identification information comparison; and a reception control step that performs reception control of the transmission data based on the address information comparison result and the identification information comparison result.

In the data reception method of the present invention, groups are synchronized by the synchronization step based on synchronization information in order to obtain the information arranged in the groups it belongs to. And in the data reception method, the address information comparison step compares the address information arranged in the selection call part and the preset address information and obtains the result of the address information comparison, and the identification information comparison step compares the identification information arranged in the transmission data region and the preset identification information and obtains the result of the identification information comparison. And in the data reception method, the reception control step performs reception control on the transmission data based on the address information comparison result and the identification information comparison result.

The data reception method receives the transmission data that comes transmitted based on the address information and identification information that is added to said transmission data In order to solve the above problems, the data transmission and reception system of this invention repeatedly performs transmission and reception processing between a data transmitter and a data receiver, taking as data transmission cycles groups that have a selection call part that consists of a transmission data region in which is arranged the transmission data to be transmitted, and an address information region in which is arranged address information indicating the addresses to which said transmission data is to be sent, and synchronization information for reading said transmission data and address information. In the data transmission and reception system, the data transmitter has an identification information arrangement means that arranges in the transmission data region identification information that shows the identity of the transmission data arranged in said transmission data region, and a transmission processing means that performs transmission processing on the transmission data as data transmission cycles; the data receiver has an address information setting means that sets the address information; an identification information setting means that sets the identification information; a synchronization means that takes synchronization of the groups based on synchronization information in order to obtain the information that is arranged within groups that it belongs to; an address information comparison means that compares the address information arranged in the selection call part and the address information set by the address information setting means and obtains the result of the address information comparison; an identification information comparison means that compares the identification information arranged in the transmission data region and the identification information set by the identification information setting means and obtains the result of the identification information comparison; and a reception control means that performs reception control of the transmission data based on the address information comparison result and the identification information comparison result.

In the data transmission and reception system having such a configuration, the data transmitter, by means of the identification information arrangement means, arranges in the transmission data region identification information that indicates the identity of the transmission data arranged in said transmission data region, and by means of the transmission processing means performs transmission processing, taking said transmission data region as the data transmission cycle. Meanwhile the data receiver, by means of the synchronization means, takes synchronization of the groups based on synchronization information for obtaining information arranged in the groups it belongs to. And the data receiver, by means of the address information comparison means, compares the address information arranged in the selection call part and the address information set by the address information setting means and obtains the result of the address information comparison, and by means of the identification information comparison means compares the identification information arranged in the transmission data region and the identification information set by the identification information setting means and obtains the result of the identification information comparison. And the data receiver, by means of the reception control means, performs reception control on the transmission data based on the address information comparison result and the identification information comparison result.

The data transmission and reception system, by means of the data transmitter, transmits after adding to the transmission data identification information as well as address information for said transmission data. And by means of the data receiver, the transmission data that comes transmitted is received based on the address information and identification information that is added to said transmission data.

DETAILED DESCRIPTION OF THE PREFERRED EMBODIMENT OF THE INVENTION

In the following, an embodiment of this invention is described in detail while making reference to the drawings. This embodiment is a broadcasting system in which data is transmitted wirelessly to a portable information communication terminal that comprises a data receiver.

Figure 2:
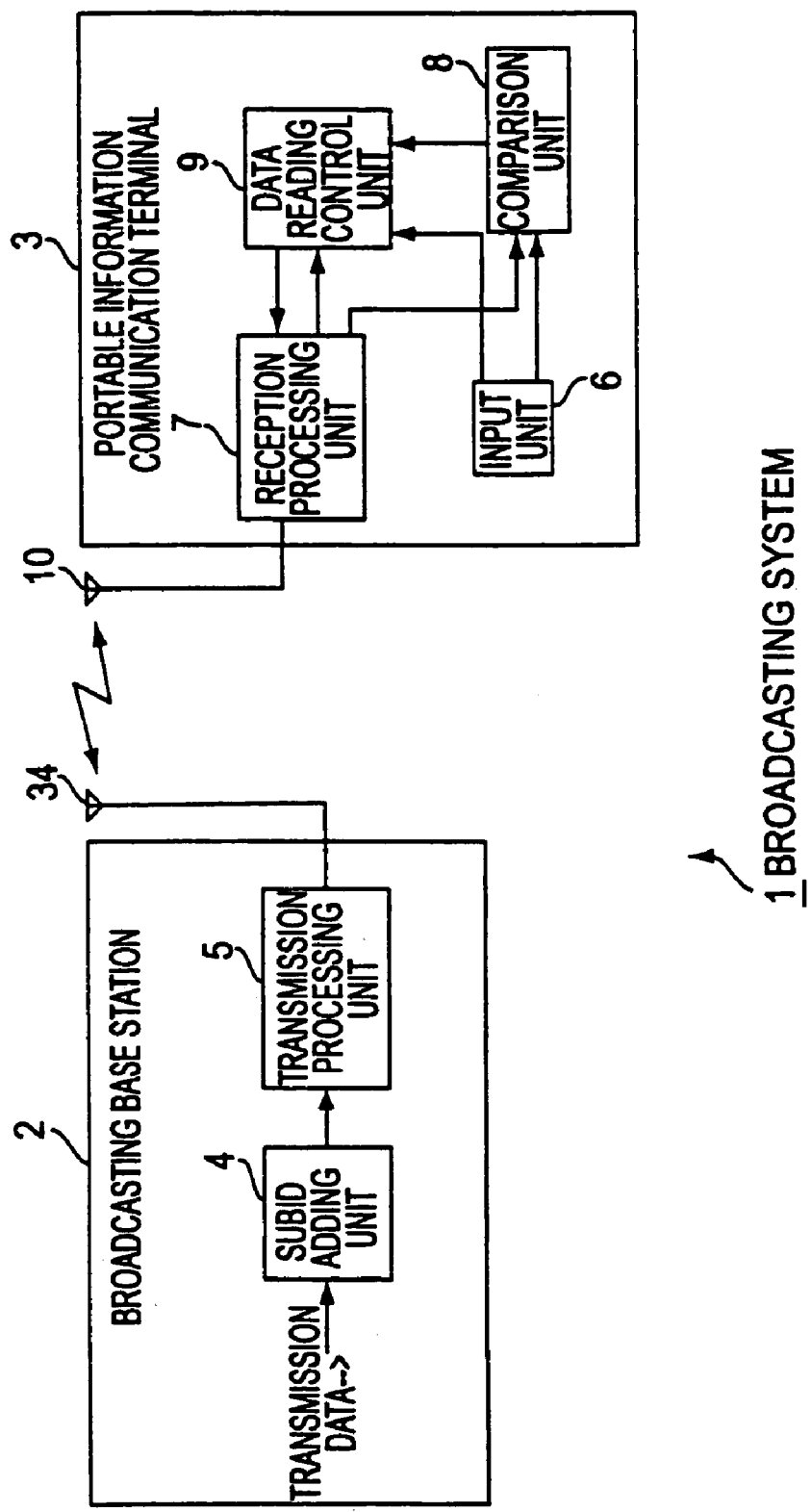
FIG. 2 is a block diagram showing the configuration of a broadcasting system according to an embodiment of this invention.

As shown in FIG. 2, a broadcasting system 1 includes a broadcasting base station 2, which broadcasts data of various types, and a portable information communication terminal 3, which receives and plays back data broadcast from broadcasting base station 2. In broadcasting system 1, transmission data, which is described below with reference to FIG. 3, is transmission-and reception-processed by prescribed data transmission cycles between broadcasting base station 2 and portable information communication terminal 3.

For example, the transmission data to be transmitted may be information that can be put to use by the user, such as information about public events or fashion information.

Broadcasting base station 2 has a subID adding unit 4, which is an identification information arrangement means that arranges in the transmission data area identification information that indicates the identity of the transmission data arranged in said transmission data area, and a transmission processing unit 5, which does transmission processing on the transmission data as data transmission cycles.

In broadcasting base station 2, which has such a composition, subID adding unit 4 does processing that arranges in the transmission data region a subID that indicates the identity of the transmission data arranged in said transmission data region, and transmission processing unit 5 does transmission processing on said transmission data, on which subID arrangement processing is done by the prescribed data transmission cycle.

Portable information communication terminal 3 has an input unit 6, which is the address information setting means that sets the ID that is the address information and is the identification information setting means that sets the subID that is the identification information, a reception processing unit 7, which has the synchronization function of taking the synchronization of group based on synchronization information in order to obtain the information arranged in the group to which it belongs, a comparison unit 8, which has the address information comparison function of comparing the ID arranged in the selection call part and the ID set by input unit 6 and obtaining the result of the address information comparison, as well as the identification information comparison function of comparing the subID arranged in the transmission data region and the subID set by input unit 6 and obtaining the result of the identification address comparison; and a data reading unit 9, which is a reception control means that performs reception control on the transmission data based on the address information comparison result and identification information comparison result obtained from comparison unit 8.

Input unit 6 has the reception control setting function of setting an indication that data reading unit 9 will do reception control on the transmission data based only on the result of the address information comparison.

For example, the ID and subID input by this input unit 6 are each stored in a register. And in the register is provided a user setting region that indicates whether the transmission data will be received based on the subID, corresponding to the ID. If it is set that reception control will be done on the transmission data based only on the result of the address information comparison (that is, if selective reception based on the subID is not done), then the user setting region is set to, for example, "0". On the other hand, if it is set that reception control will be done on the transmission data based only on the result of the address information comparison and the result of the identification information comparison (that is, if the subID is also referred to in doing selective reception), then the user setting region is set to, for example, "1".

Broadcasting system 1, which has such a composition, performs the desired transmission and reception processing on the data based on the ID and subID.

Figure 3A:
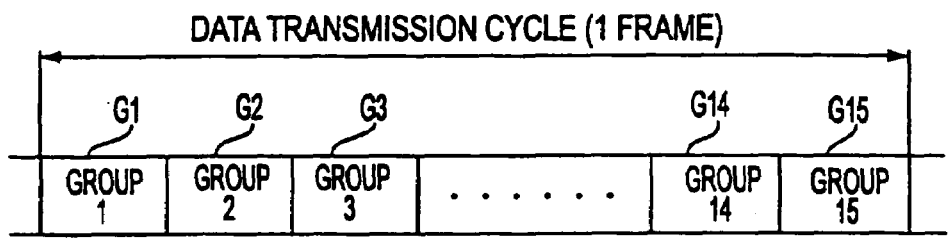
FIG. 3(A–C) is a diagram showing the format of a data frame for data transmission in a broadcasting system.
Figure 3B:
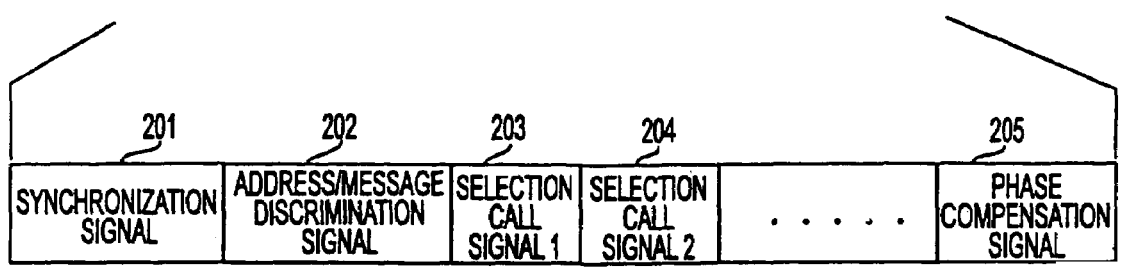
Figure 3C:
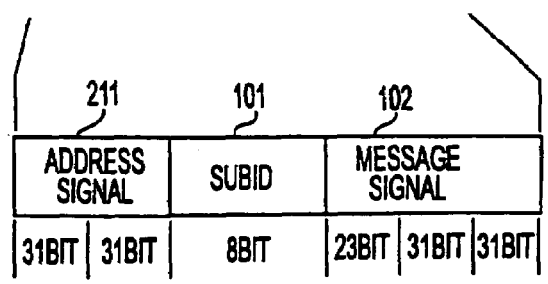

Specifically, the data frame for data transmission that is adopted in this broadcasting system 1 is constituted as shown in FIG. 3A through C.

A feature of the data frame that is thus composed is that the subID is arranged in part of the message region within the selection call signal.

As shown in FIG. 3A, the format of the data frame is similar to the previous format: 1 frame consists of 15 groups G1, G2, G3, G4, . . . , G14, G15 as data transmission cycles.

As shown in FIG. 3B, each group, as in the previous data frame format, consists of synchronization signal 201, which consists of synchronization information, address/message discrimination signal 202, selection call signals 203, 204, which are multiple selection call parts, and phase compensation signal 205. Here each frame has a period of, for example, 29 seconds.

Synchronization signal 201 is the part by which portable information communication terminal 3 correspondingly synchronizes the group it belongs to and receives the selection call signal of its self-address in said synchronized group. The portable information communication terminal 3 belongs to some one group within the frame, takes its synchronization by receiving the synchronization signal of the group to which it belongs, and receives the selection call signal within its group.

As shown in FIG. 3C, selection call signals 203, 204 consist of address signal (address information ID) 211 and message signal (transmission data) 102; for example, the constituent units of both signals is error-correcting code word [BCH(31,16)]. And in these selection call signals 203, 204, said subID 101 is stored in the proper message signal region.

For example, each selection call signal 203, 204 has a content set to 31-bit units and consists of 155 bits in all. Specifically, each selection call signal has an address signal of 62 bits, subID 101 of 8 bits, and a message signal of 85 bits.

Address signal 211 is set to the address that indicates the identity of portable information communication terminal 4. Here, address signal 211 is a so-called self-address; heretofore, portable information communication terminal 3 has been set to the unique identification information (ID) of said portable information communication terminal 3 used for reception of transmission that comes transmitted to the self-address, and the types have been subject to physical restrictions. By contrast, it can be said that the subID is subject to no such restrictions.

For example, with portable information communication terminal 3, the pager sounds a tone and the message signal is decoded and its content is displayed if its own address signal is present among the selection call signals that are received.

Also, subID 101 is information that indicates the identity or type of transmission data that is to be transmitted. SubID 101 is set to be accessory data of the transmission data; for example, if the transmission data is fashion information, it consists of the age, sex, and other attributes of the users to whom it is to be distributed.

Figure 1A:
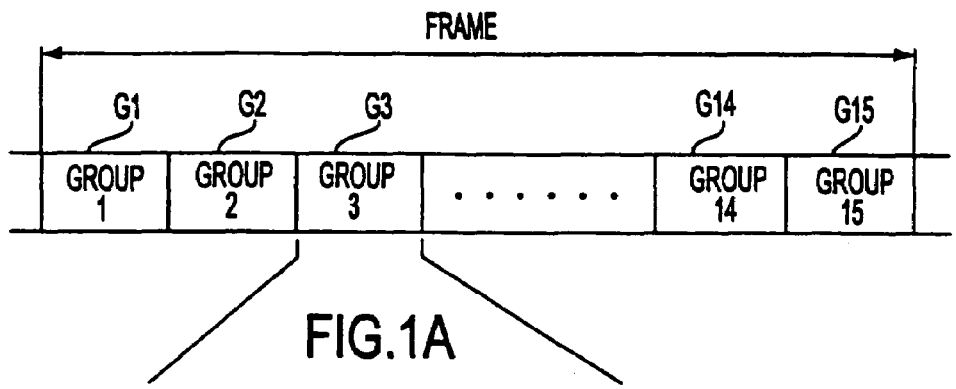
FIG. 1(A–C) is a diagram showing the format of a data frame for conventional data transmission adopted in a wireless call system.
Figure 1B:
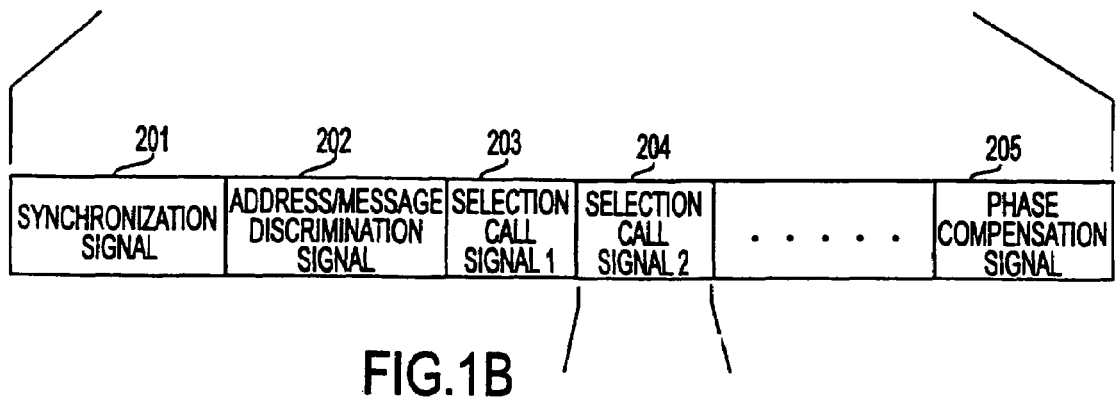
Figure 1C:
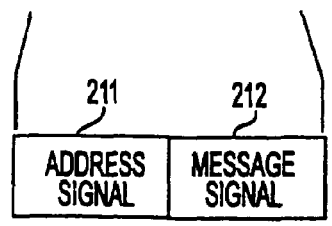

Here, the transmission data storage region is the region where the message signal has previously been stored, consisting of a prescribed format in the selection call signals. It is the message signal storage region in which only message signal 212 shown in FIG. 1 is stored, and it is a part that is expressed by 93 bits. As shown in FIG. 3C, subID 101 is expressed by the leading 8 bits of this transmission data storage region (hereafter called the message signal storage region).

Address/message identification signal 202 indicates in code word units the alignment of address signal 211, subID 101, and message signal 102 within the selection call signal.

Phase compensation signal 205 is used on the base station side to match the phase of transmission signals between base stations.

Broadcasting system 1 adopts a data frame of this composition as the data format for transmission. In broadcasting system 1, portable information communication terminal 3 receives, based on its ID and subID, the data to which the ID (address signal 211) and subID 101 are added and which is broadcast from broadcasting base station 2.

Next, the broadcasting system 1 will be described in detail, citing specific configuration examples.

Figure 4:
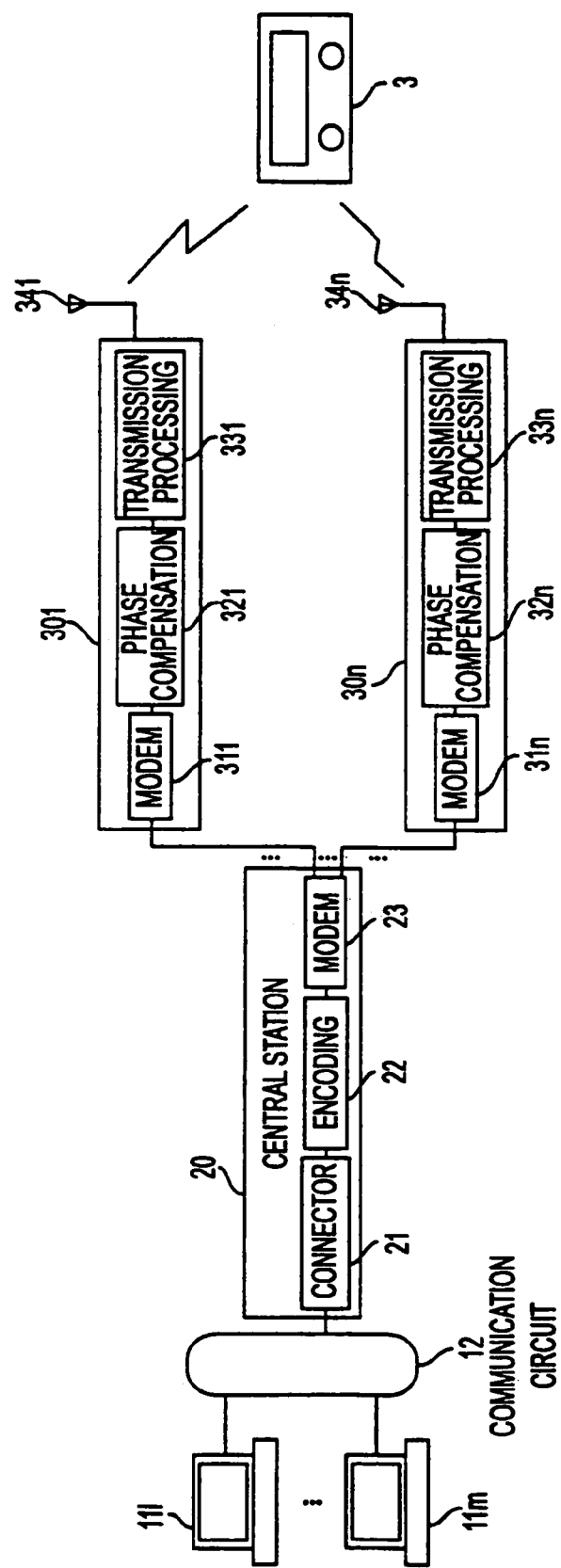
FIG. 4 is a diagram showing a specific example on the side of the data transmission broadcaster in a broadcasting system.

As shown in FIG. 4, broadcasting system 1 consists of 11(1) through 11(*m*), which are connected to communication circuit 12 and into which information is input from the information provider; central station 20, which performs prescribed processing, such as ID conversion, in response to data to which is added an ID, which is identification information sent from input devices 11(1) through 11(*m*); communication circuit 12, which transmits data between input devices 11(1) through 11(*m*) and central station 20; multiple base stations 30(1) through 30(*n*), which each perform the prescribed processing, such as transmission processing, on the data from central station 20 and transmit from their respective antennas 34(1) through 34(*n*); and multiple portable information communication terminals 3, which receive the data transmitted wirelessly from antennas 34(1) through 34(*n*).

Personal computers, for example, are used for input devices 11(1) through 11(*m*), and data of various types, text, for example, is input to them. Specialized software for input, editing, and communication is pre-installed on these input devices 11(1) through 11(*m*).

When, for example, various data is input by these input devices 11(1) through 11(*m*), the subID that corresponds to the data is input. Then transmission takes place of the data and subID that are to be transmitted from input devices 11(1) through 11(*m*) to central station 20 via communication circuit 12.

Communication circuit 12 consists by a general analog circuitry, or it may be constituted using a telephone network or packet network such as a ISDN (integrated services digital network) or OCN (open computer network).

Central station 20 has a connection center 21, an encoder 22, and a modem 23.

Connection center 21 performs management processing on the transmission data to be sent from input devices 11(1) through 11(m). The connection center 21 generates an address signal (ID) that corresponds to the transmission data. For example, in the case of a radio paging system, this address signal is set to the call number of the pager.

Also, connection center 21 performs, for example, a check of ID codes that are valid at the present time with respect to the data, a check of compliance with the predefined distribution schedule, and sometimes a check of the quality of the data content.

Encoder 22 encodes, by a prescribed method, the transmission data that comes transmitted from connection center 21.

Modem 23 receives the data encoded by encoder 22, transforms this data to serial data by the prescribed method, and transmits it to base stations 30(1) through 30(n).

Each base station 30 has a modem 31, a phase compensator 32, a transmission processing unit 33 and an antenna 34. The base stations 30(1) through 30(n) comprise a broadcasting processing means that performs broadcasting processing for broadcasting data to which an ID is added.

Modem 31 receives the data that is transmitted from modem 23 of central station 20 as serial data of the prescribed format.

Phase compensator 32 performs phase compensation on the data received from modem 31.

Transmission processing unit 33 performs modulation or other processing on the data phase-compensated in phase compensator 32 in order to emit it wirelessly from antenna 34. Specifically, in order to put a waveform offset on the phase-compensated data, a phase-shifted sine wave is superimposed on each base station 30(1) through 30(n), and FSK (frequency-shift keying) modulation is performed.

Antenna 34 transmits wirelessly the data that is signal-processed in base station 30.

Here, encoder 22 of central station 20 and phase compensator 32 and transmission processing unit 33 of base station 30 comprise subID adding unit 4 and transmission processing unit 5 shown in FIG. 2. The subID, that indicates the identity of the transmission data that is stored in the transmission data region, is stored in said transmission data region by encoder 22, phase compensator 32, and transmission processing unit 33 (thus, the subID is embedded in the leading 8 bits of the transmission data storage region); and by the prescribed data transmission cycle, transmission processing is done on said transmission data as the data frame shown in FIG. 3.

As shown in FIG. 2, portable information communication terminal 3 has input unit 6, reception processing unit 7, comparison unit 8, and data reading control unit 9.

Reception processing unit 7 comprises a part that performs signal processing, etc. on the transmission data from broadcasting base station 2 that is received by antenna 10. For example, reception processing unit 7 performs demodulation processing on the received data. Also, reception processing unit 7 has the synchronization function of taking synchronization by receiving synchronization signal 201 of the group it belongs to. Also, reception processing unit 7 has a memory (not shown) for temporarily holding the data it receives.

Input unit 6 is configured to perform input and setting, etc. of various information by the receiving party; for example, input unit 6 consists of various keys, buttons, etc.

The ID and subID can be set by operating input unit 6. Also, with input unit 6 one can set it so that data reading control unit 9 performs reception control of the transmission data based only on the result of the address information comparison.

Comparison unit 8 compares the ID in the group synchronized by reception processing unit 7 and the ID set by input unit 6 and obtains the result of the address information comparison. Also, comparison unit 8 compares the subID in that group and the subID set by input unit 6 and obtains the result of the identification information comparison. For example, comparison unit 8 reads the ID and subID added to the transmission data temporarily held in the memory of reception processing unit 7 and makes a comparison with the ID and subID previously set by input unit 6.

Specifically, comparison unit 8 reads the ID (address signal) in the selection call signal. Then, if said address signal is its own address, comparison unit 8 reads the subID. Based on the comparison by this comparison unit 8 between the ID and subID of the transmission data and the ID and subID input by input unit 6, portable information communication terminal 3 receives the transmission data to which said ID and subID are added.

Data reading control unit 9 constitutes a part that performs reception control on the transmission data based on the address information comparison result and identification information comparison result by comparison unit 8. Here, reception control of the transmission data is reading processing of the transmission data done based on the ID and subID; for example, the read transmission data is stored in a non-volatile memory or other storage means (not shown) of said portable information communication terminal 3.

For example, ID comparison unit 8 and data reading control unit 9 are realized by the functions of a CPU that controls the parts of portable information communication terminal 3.

By having such a configuration, the portable information communication terminal 3 takes synchronization from the synchronization information of the group it belongs to, by means of reception processing unit 7. In portable information communication terminal 3, comparison unit 8 compares the ID stored in the selection call part and the ID set by input unit 6 and obtains the result of the address information comparison, and compares the subID stored in the message signal region and the subID set by input unit 6 and obtains the result of the identification information comparison. And in portable information communication terminal 3, data reading control unit 9 performs reception control of the transmission data based on the address information comparison result and identification information comparison result.

If it is set from input unit 6 that data reading control unit 9 shall perform reception control on the transmission data based only on the result of the address information comparison, portable information communication terminal 3 performs reception control on the transmission data based only on the result of the address information comparison. For example, in this way it becomes possible to selectively receive transmission data based only on the result of the address information comparison, regardless of the result of the identification information comparison. This is the case in which portable information communication terminal 3 receives all the transmission data to which its own address has been added, regardless of the result of the identification information comparison.

In this broadcasting system 1, broadcasting base station 2, with respect to the transmission data, adds address information (ID) and identification information (subID) indicating the type of the transmission data, and transmits the transmission data. In this way, portable information communication terminal 3 can selectively take in transmission data based on the ID and subID that are added to said transmission data.

Formerly, in broadcasting system 1 a certain limited number of IDs were used, and the user selectively executed decoding of the transmission data based on such an ID. In this invention, it has become possible to set whether decoding shall be done including, in addition to the former IDs, a subID expanded into the message signal region. This makes it possible, in addition to data reception by ID as formerly, to receive transmission data selectively by reference also to the subID.

Figure 5:
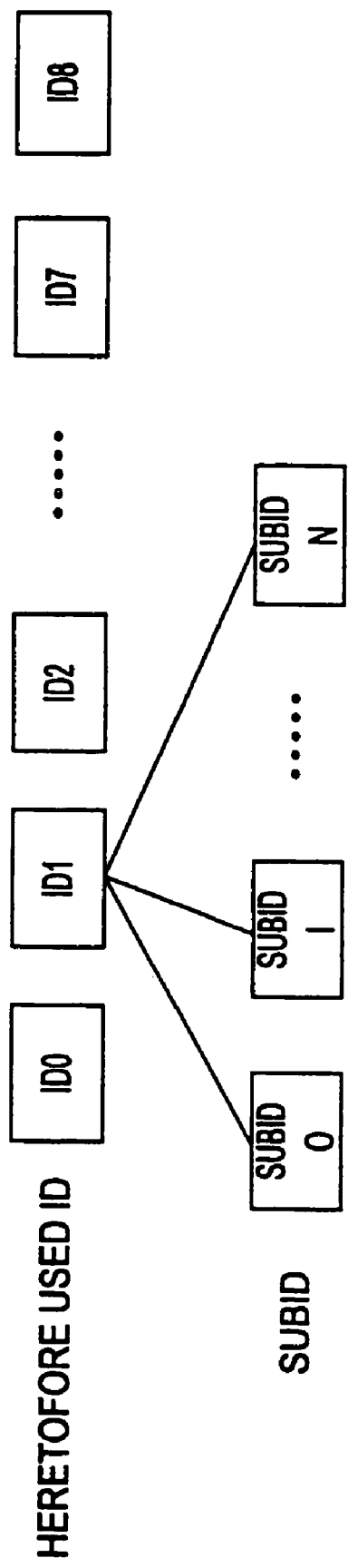
FIG. 5 is a diagram showing the relationship between the ID and subID that are added to the transmission data in a broadcasting system.

The relationship between ID and subID is as shown in FIG. 5: multiple subIDs are associated with each ID; one ID is expanded to hold multiple subIDs 0, 1, . . . , N (where N is an integer). For example, if, as shown in FIG. 3C, a subID is 8 bits, then logically the number of subIDs that a single ID can be expanded into is 256.

With such a broadcasting system 1, specifically, each ID held in portable information communication terminal 3 has a user's setting region, and by examining the content of this setting region, one can selectively receive by referring also to the subID. As described above, if the user setting region is "0", then conventional reception is decided upon and no selective reception by subID is done, but if it is "1", then it is decided that subIDs have been added to the transmission data, subID decoding is done, and selective reception of said transmission data is done.

Now, a specific example of selective reception using a subID will be described.

For example, if an apparel manufacturer broadcasts fashion information as transmission data with a certain ID, information about sex, age, season, etc. is added to said fashion information by subIDs.

Correspondingly, the broadcast recipient sets this apparel manufacturer's ID on portable information communication terminal 3, and also makes a setting that the information flowing in on this ID has subIDs. Then the recipient sets the subIDs that he is interested in himself.

In this way, the recipient is able to receive a distribution of information from the apparel manufacturer according to the ID and also according to subIDs identifying such conditions as sex, age, and season. The recipient can acquire just that fashion information from the apparel manufacturer that matches the conditions.

Specifically, if for example the apparel manufacturer uses an 8-bit subID and sends out fashion information as transmission data in which information specifying the sex is put in bit 0, the season in bits 1–2, and age in bits 3–7, then each user can selectively receive said fashion information by setting each bit as desired on his portable information communication terminal 3.

And if one wishes to receive all the information, then as described above, one can receive all the information, making no selections, by setting the user setting region to 0.

As described above, with broadcasting system 1 one can send out information from broadcasting base station 2, which is the sender's side, in finer divisions of classification by adding subIDs to each ID.

And on portable information communication terminal 3, which is the recipient's side, the ID can be expanded by hierarchically selecting by subID the information sent under a single ID.

In this way one can build a broadcasting system that can handle a finer classification and greater variety of information, without affecting the conventional communication system.

Next, we describe a specific application of portable information communication terminal 3. FIGS. 6 through 10 show an entertainment system, in which portable information communication terminal 3 is constituted a portable electronic device 400.

Figure 6:
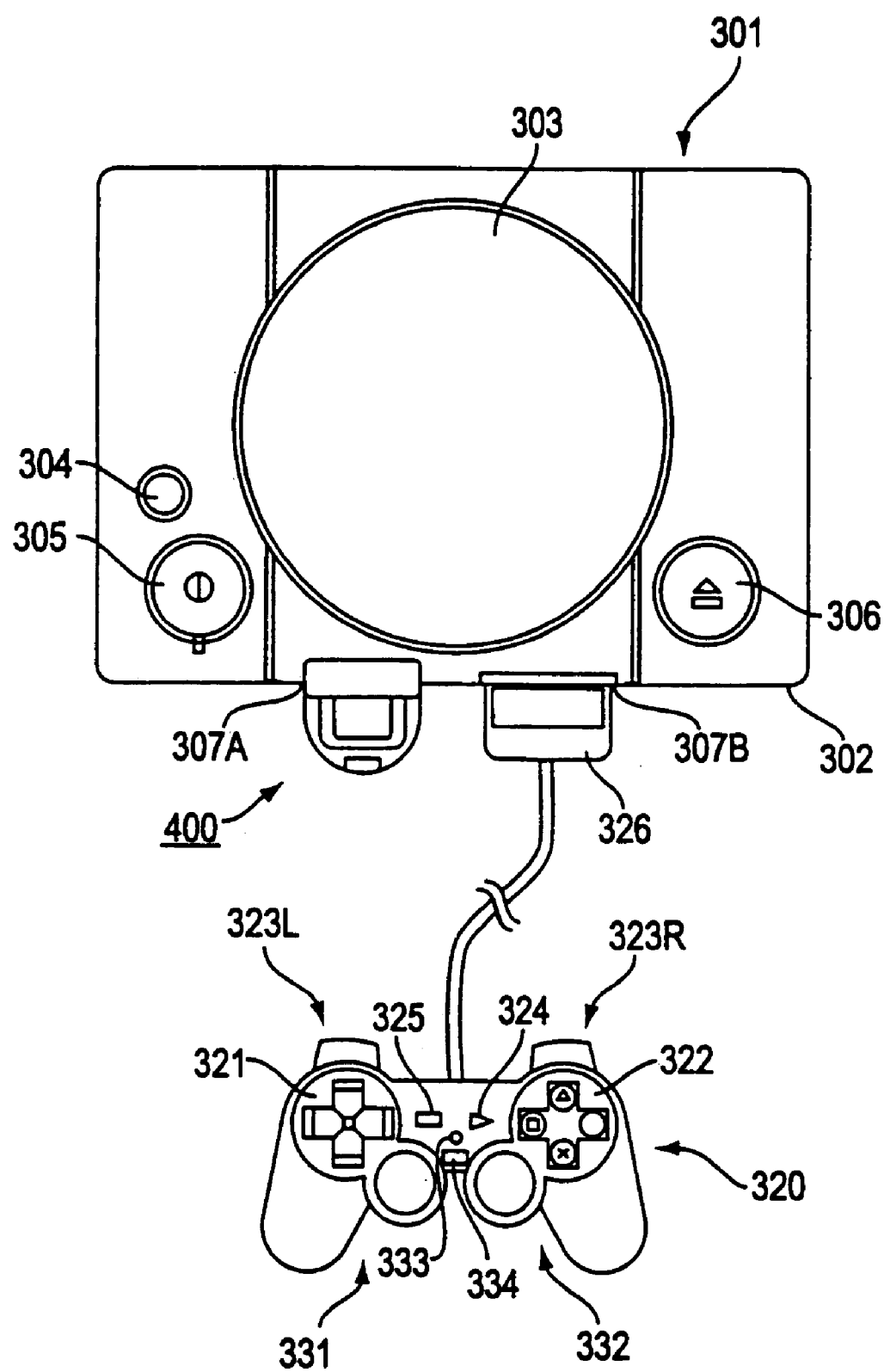
FIG. 6 is a top view showing a configuration of an entertainment system having a portable information communication terminal, which is a data reception terminal of a broadcasting system.
Figure 7:
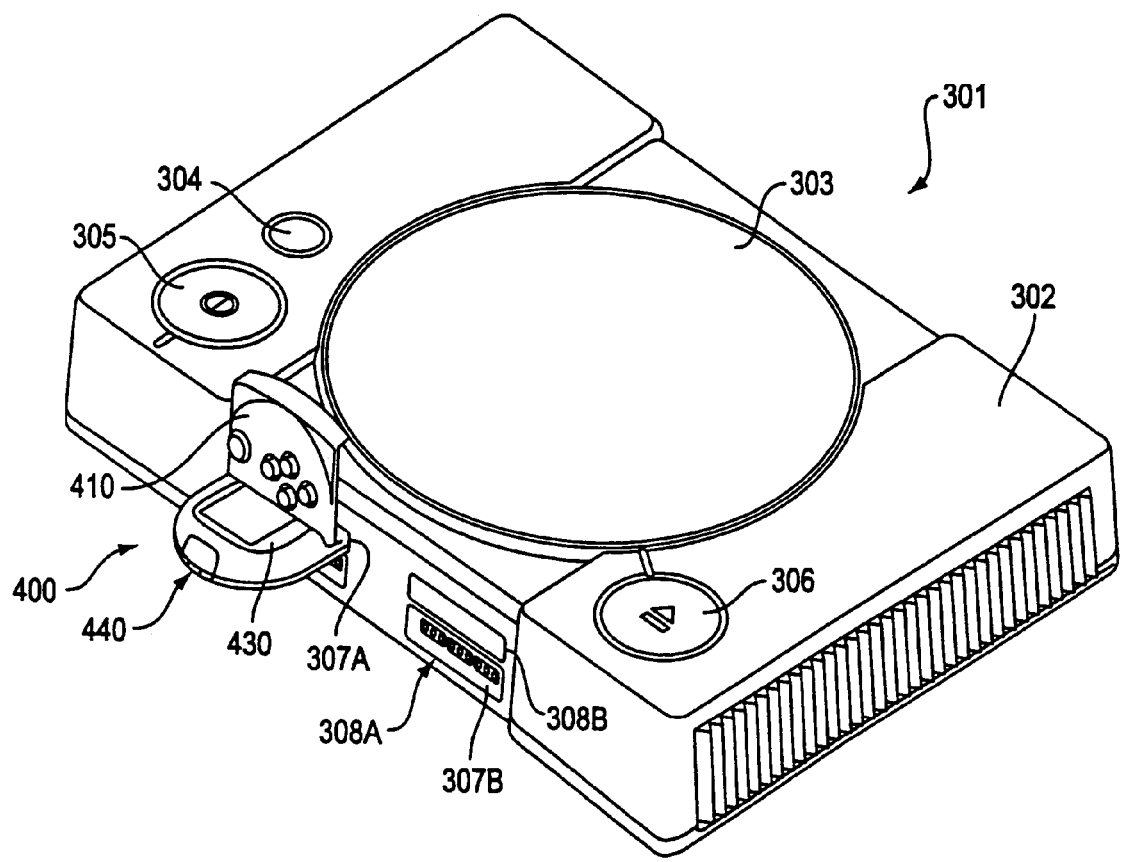
FIG. 7 is a perspective view showing the composition of an entertainment system of FIG. 6.

As shown in FIGS. 6 and 7, the entertainment system includes a video game device 301 and a portable electronic device 400, which is portable information communication terminal 3, that detachably connects to the video game device 301 and handles data communication with said video game device 301. In the entertainment system, video game device 301 is constituted as the parent machine, and portable electronic device 400 is constituted as its child machine. For example, in this entertainment system, video game device 301 is constituted as a means that executes game programs recorded on a CD-ROM or other recording medium, and portable electronic device 400 is constituted as a means that receives data transmitted by broadcasting.

Main unit 302 of video game device 301 has a disk holder 303, on which is mounted an optical disk that supplies video games and other application programs, a reset switch 304, a power switch 305, a disk operation switch 306, and two slots 307A, 307B.

Portable electronic device 400 (portable information communication terminal 3) and a controller 320 or a memory card system can be connected to slots 307A, 307B.

Controller 320 has first and second operation units 321, 322, a left button 323L, a right button 323R, a start button 324, a selection button 325, and operation units 331, 332 which allow analog operation, a mode selection switch 333, and operation mode display unit 334.

Figure 8A:
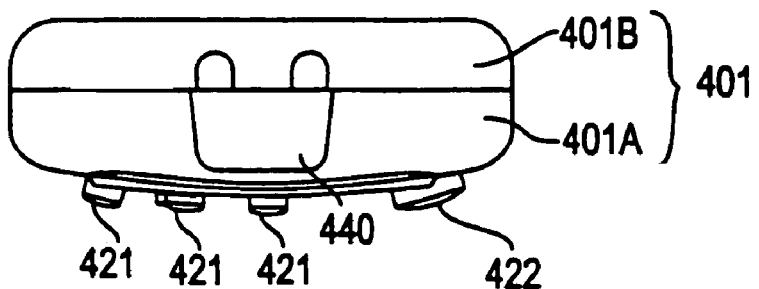
FIG. 8(A–C) is a diagram showing a configuration of a portable electronic device.
Figure 8B:
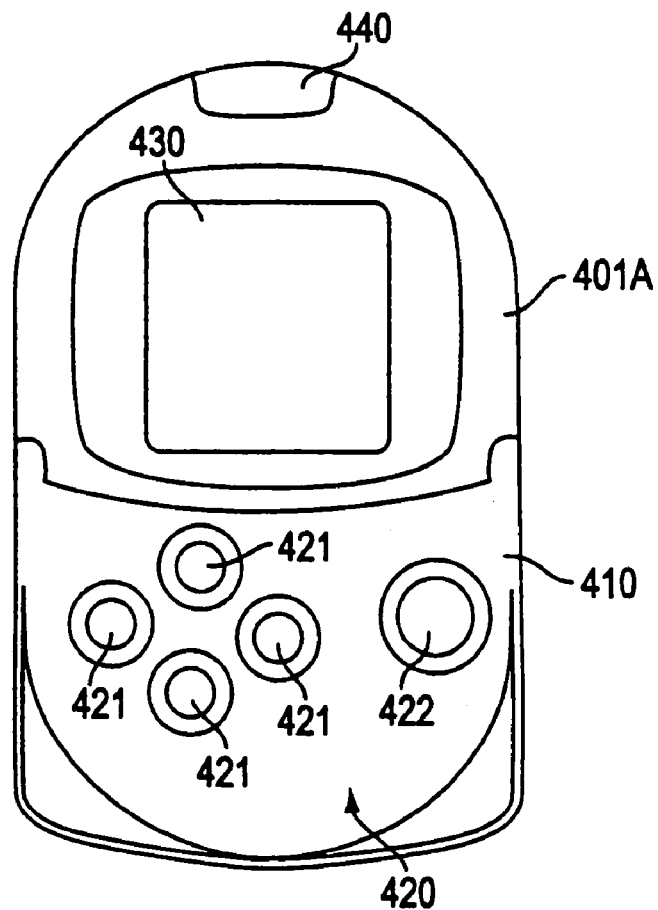
Figure 8C:
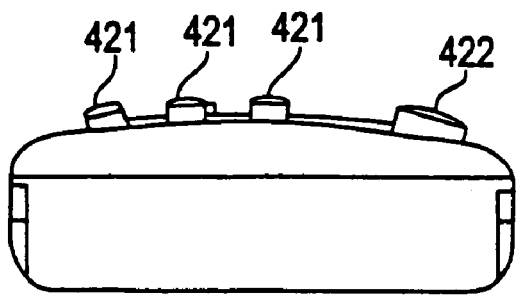

As shown in FIG. 8A through 8C, portable electronic device 400 has a housing 401, and is equipped with an operation unit 420 for the input of various information, a display unit 430, which consists of, for example, a liquid crystal display (LCD), and a window unit 440 for performing wireless communication by, for example, infrared rays.

Operation unit 420 is equipped with multiple operation buttons 421, 422. Switch pressing units are provided in positions corresponding to the positions of operation buttons 421, 422, sealed in by a cover 410. When an operation button 421, 422 is pressed, the switch pressing unit presses a pressure switch, such as a diaphragm switch.

As shown in FIG. 7, portable electronic device 400 is mounted into the main unit 302 of video game device 301 with its cover 410 open.

Figure 9:
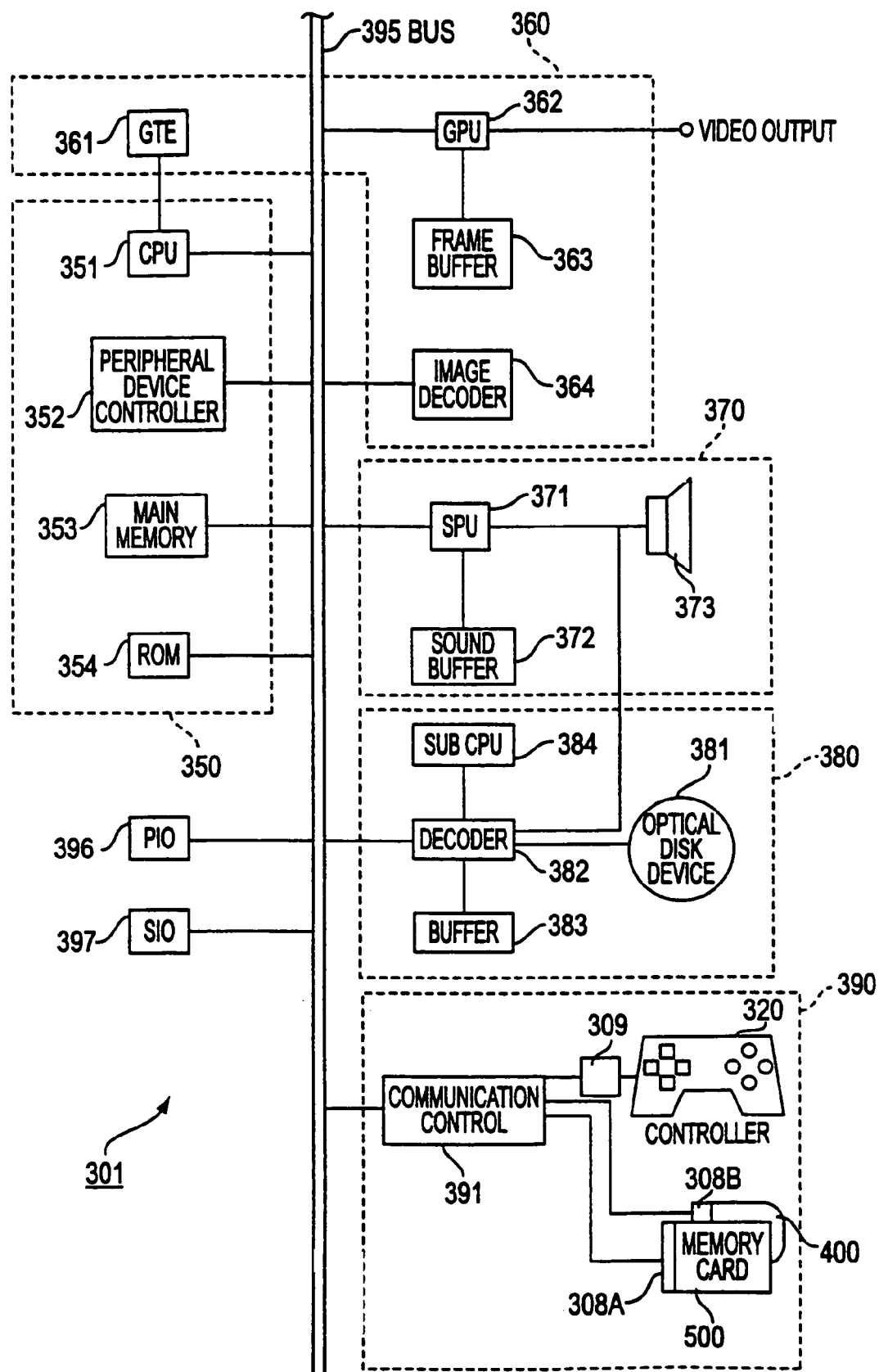
FIG. 9 is a block diagram showing a configuration of a video game device.

FIGS. 9 and 10 show the circuitry of video game device 301 and portable electronic device 400.

As shown in FIG. 9, video game device 301 has a control system 350, which includes a central processing unit (CPU) 351 and its peripheral devices; a graphic system 360, which includes a graphic processing unit (GPU) 362, which draws to a frame buffer 363, a sound system 370, which includes a sound processing unit (SPU) that produces musical tones and sound effects, an optical disk controller 380, which controls the optical disk on which application programs are recorded, a communication controller 390, which controls input and output of signals from controller 320 and data from memory card 500 and portable electronic device 400, a bus 395, to which the above parts are connected, a parallel input-output interface (PIO) 396, which consists of an interface with other devices, and a serial input-output interface (SIO) 397.

Figures 10A, 10B:
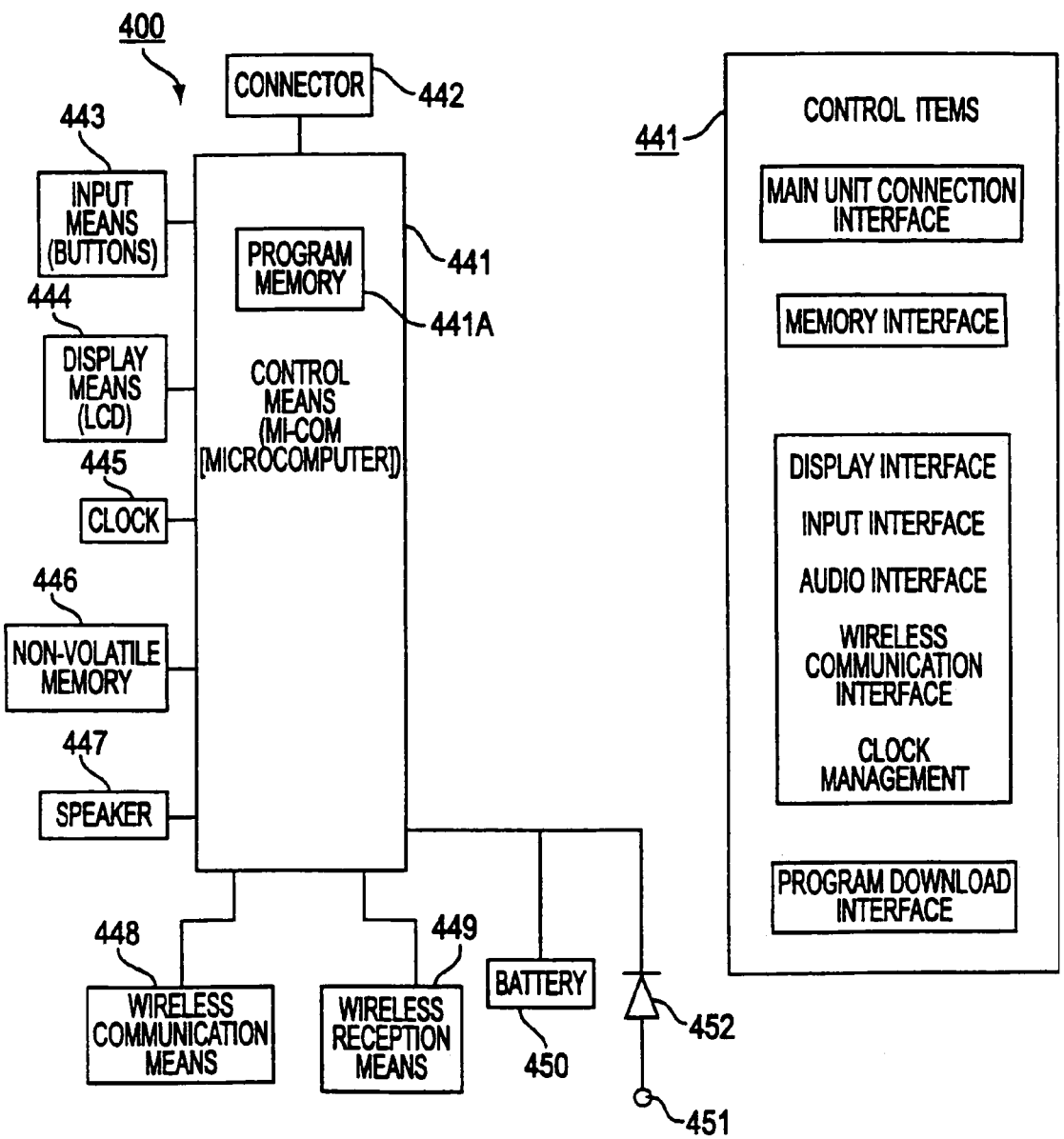
FIG. 10 is a block diagram showing a configuration of a portable electronic device.

As shown in FIG. 10A, portable electronic device 400 has a control unit 441, a connector 442, an input unit 443, a display unit 444, time function unit 445, a non-volatile memory 446, a speaker 447, a wireless communication unit 448 and a wireless reception unit 449 as data transmission and reception means, battery 450, and a power source terminal 451 and a diode 452, which constitute a power storage means.

Control unit 441, for example, employs a microcomputer (abbreviated to "mi-com" in the diagram). Control unit 441 has inside it a program memory unit 441a, which is a program storage means. Also, control unit 441 has functions of comparison unit 8 and data reading unit 9, which are shown in FIG. 2.

Connector 442 is constituted as a connection means for connecting to the slot of other information devices. For example, connector 442 is constituted to have a data communication function for transmitting and receiving data to and from video game device 301.

Input unit 443 consists of operation buttons for operating stored programs. The input unit 443 corresponds to input unit 6 in FIG. 2.

Wireless reception unit 449 is a part that is constituted to have an antenna and demodulation circuitry; it is constituted as a part that receives various data transmitted by wireless broadcasting. Also, this wireless reception unit 449 has a memory for temporarily storing broadcast data that it receives. This wireless reception unit 449 is constituted to have the functions of antenna 10 and reception processing unit 7 in FIG. 2.

Each of the above parts is connected to control unit 441 and operates under the control of control unit 441.

FIG. 10B shows the control items of control unit 441. As shown in FIG. 10B, control unit 441 has a main unit connection interface to information devices, a memory interface for data input and output with the memory, a display interface, an operation input interface, a sound interface, a wireless communication interface, time management, and a program download interface.

By having input unit 443, with its button switches for operating programs that are executed, and display unit 444, which employs a liquid crystal display (LCD), etc., portable electronic device 400, which is thus constituted, also functions as a portable game device when a game application is run.

In addition, the portable electronic device 400 has the function of downloading programs from video game device 301 and storing application programs in program memory 441a in microcomputer 441, and in this way one can easily modify the application programs or various driver software that run on said portable electronic device 400.

Also, this portable electronic device 400 can receives, by means of wireless reception unit 449, transmission data transmitted by broadcast from broadcasting station 2 (FIG. 2) and can selectively receive said transmission data based on the IDs and subIDs added to the transmission data it receives.

The entertainment system is constituted as described above. With this entertainment system, with portable electronic device 400 it is possible to selectively receive transmission data based on the IDs and subIDs. Portable electronic device 400 can also transmit to video game device 301. Video game device 301 can replay the transmission data that is transmitted to it and employ it as data for use in video games.

Specifically, subIDs can be employed in video games as follows. A game is executed on video game device 301 or portable electronic device 400, and subIDs are set in accordance with the stage of progress of the game. For example, a subID may be set in a game if a certain stage (scene) is cleared.

On the other side, with a broadcasting station that broadcasts various data, data needed for playing the game being run on video game device 301 or portable electronic device 400 is broadcast, adding subIDs as transmission data. For example, the data needed for video game device 301 or portable electronic device 400, which has cleared a stage, to execute the next stage is broadcast, with a subID added to it.

In such a case, since the prescribed subID is not generated on video game device 301 or portable electronic device 400 unless the stage is cleared, naturally the next stage cannot be executed. That is, video game device 301 or portable electronic device 400 generates a subID by clearing a stage, and it becomes possible to execute the next cleared stage by receiving transmission data to which is added a subID that matches that subID.

Thus the value of employing video game device 301 or portable electronic device 400 is increased by adding subIDs to the data that is used in a video game.

With the data transmission method of this invention, it is possible to transmit while adding to the transmission data identification information as well as address information of said transmission data.

This makes it possible to build a data transmission and reception system that can handle a finer division and greater variety of information, without affecting the existing communication system.

And with the data transmitter of the invention, the identification information arrangement means arranges in the transmission data region identification information that indicates the identity of the transmission data arranged in said transmission data region, and the transmission processing means processes said transmission data region as data transmission cycles.

The data transmitter of the invention can transmit while adding to the transmission data, besides address information for said transmission data, identification information as well.

This makes it possible to build a data transmission and reception system that can handle a finer division and greater variety of information, without affecting the existing communication system.

With the data receiver of the present invention, the synchronization unit or means can synchronize groups based on synchronization information in order to obtain the information that is arranged in the group it belongs to, the address information comparison means compares the address information arranged in the selection call part and the address information set by the address information setting means and obtains the result of the address information comparison, and the identification information comparison means compares the identification information arranged in the transmission data region and the identification information set by the identification information setting means and can obtain the result of the identification information comparison. And the data receiver can, by means of the reception control means, perform reception control on the transmission data based on the address information comparison result and the identification information comparison result.

The data receiver can receive the transmission data that comes transmitted, based on the address information and identification information that is added to said transmission data. This makes it possible to build a data transmission and reception system that can handle a finer division and greater variety of information, without affecting the existing communication system.

Also, with the data reception method of the present invention, the synchronization step can synchronize groups based on synchronization information in order to obtain the information that is arranged in the group it belongs to, the address information comparison step compares the address information arranged in the selection call part and the preset address information and obtains the result of the address information comparison, and the identification information comparison step compares the identification information arranged in the transmission data region and the preset identification information and can obtain the result of the identification information comparison. The data reception method can, by means of the reception control step, perform reception control on the transmission data based on the address information comparison result and the identification information comparison result.

With this data reception method, one can receive the transmission data that comes transmitted, based on the address information and identification information that is added to said transmission data. This makes it possible to build a data transmission and reception system that can handle a finer division and greater variety of information, without affecting the existing communication system.

With respect to the data transmission and reception system of the invention, with the data transmitter it is possible, by means of the identification information arrangement means, to arrange in the transmission data region identification information that indicates the identity of the transmission data arranged in said transmission data region, and by means of the transmission processing means, to perform transmission processing, taking said transmission data region as the data transmission cycle. Meanwhile the data receiver, by means of synchronization means, takes synchronization of the groups based on synchronization information for obtaining information arranged in the groups it belongs to, and by means of the address information comparison means, compares the address information arranged in the selection call part and the address information set by the address information setting means and obtains the result of the address information comparison, and by means of identification information comparison means compares the identification information arranged in the transmission data region and the identification information set by the identification information setting means and can obtain the result of the identification information comparison.

The data receiver, by means of the reception control means, can perform reception control on the transmission data based on the address information comparison result and the identification information comparison result.

The data transmission and reception system, by means of the data transmitter, transmits after adding to the transmission data identification information as well as address information for said transmission data, and by means of the data receiver, the transmission data that comes transmitted is received based on the address information and identification information that is, added to said transmission data.

This makes it possible to build a data transmission and reception system that can handle a finer division and greater variety of information, without affecting the existing communication system.

What is claimed is:

1. A data receiver to which come repeatedly transmitted, as data transmission cycles, groups of data that have a selection call part consisting of a transmission data region in which are arranged the transmission data being transmitted and identification information that indicates the identity of said transmission data and an address information region in which is arranged address information that indicates the destination address of said transmission data, the data receiver comprising:
   an address information setting means that sets address information;
   an identification information setting means that sets identification information in accordance with a stage of progress of a game program when the data receiver executes the game program;
   an address information comparison means that compares the address information arranged in said selection call part and the address information set by said address information setting means and obtains a result of the address information comparison;
   an identification information comparison means that compares the identification information arranged in said transmission data region with the identification information set by said identification information setting means and obtains a result of the identification information comparison, the identification information being set by said identification information setting means when said stage of progress of the game program is cleared, when said game program is executed in said receiver; and
   a reception control means that performs reception control on said transmission data based on said address information comparison result and said identification information comparison result.

2. The data receiver of claim 1, further comprising a reception control setting means that sets it so that said reception control means performs reception control on the transmission data based only on said address information comparison result.

3. The data receiver of claim 1, wherein said address information is set to identification information that is unique to said data reception terminal that it uses for reception of transmission data that comes transmitted to its own address, and identification information indicating said transmission data consists of information that has no restrictions on a type thereof.

4. The data receiver of claim 1, wherein information of multiple types of different attributes is arranged in said identification information.

5. The data receiver of claim 1, wherein said groups have synchronization data for reading said transmission data and address information, and further comprising a synchronization means that synchronizes said groups based on synchronization information in order to obtain the information that is arranged in said groups to which it belongs.

6. The data receiver as described in claim 5, wherein said groups in which said transmission data region, said address information region, and said selection call pan are arranged and to which said synchronization information is added comprise transmission data frames of a wireless call system, and wherein said transmission data region serves as a message signal region.

7. A data reception method which is a data reception method that receives data in which there come repeatedly transmitted, as data transmission cycles, groups of data that have a selection call part consisting of a transmission data region in which are arranged the transmission data being transmitted and identification information that indicates the identity of said transmission data and an address information region in which is arranged address information that indicates the destination address of said transmission data, the data reception method comprising:

an identification information setting step that sets identification information in accordance with a stage of progress of a game program when the game program is executed;

an address information comparison step that compares the address information arranged in said selection call part and the preset address information and obtains a result of the address information comparison;

an identification information comparison step that compares the identification information arranged in said transmission data region with said identification information being set by said identification information setting step when said stage of progress of the game program is cleared, when said game program is executed; and a reception control step that performs reception control on said transmission data based on said address information comparison result and said identification information comparison result.

8. The data reception method claim 7, further comprising a reception control step that sets it so that in said reception control step, reception control is done on the transmission data based only on the result of said address information comparison.

9. The data reception method of claim 7, wherein said address information is set to identification information that is unique to said data reception terminal that it uses for reception of transmission data that comes transmitted to its own address, and identification information indicating said transmission data consists of information that has no restriction on a type thereof.

10. The data reception method of claim 7, wherein information of multiple types of different attributes is arranged in said identification information.

11. The data reception method of claim 7, wherein said groups have synchronization data for reading said transmission data and address information, and further comprising a synchronization step that synchronizes said groups based on synchronization information in order to obtain the information that is arranged in said groups to which it belongs.

12. The data reception method of claim 7, wherein said groups in which said transmission data region, said address information region, and said selection call part are arranged and to which said synchronization information is added comprise transmission data frames oh wireless call system, and wherein said transmission data region serves as a message signal region.

13. A data transmission and reception system which repeatedly performing transmission and reception processes of groups of data, between a data transmitter and a data receiver, as data transmission cycles, said groups of data having a selection call part consisting of a transmission data region in which is arranged the transmission data being transmitted and an address information region in which is arranged address information that indicates the destination address of said transmission data;

said data transmitter comprising an identification information arrangement means that arranges in said transmission data region identification information that shows the identity of the transmission data arranged in said transmission data region, and a transmission processing means that performs transmission processing on the transmission data as said data transmission cycles; and said data receiver comprising an address information setting means that sets the address information; an identification information setting means that sets identification information in accordance with a stage of progress of a game program when the data receiver executes the game program; an address information comparison means that compares the address information arranged in said selection call part and the address information set by said address information setting means and obtains a result of the address information comparison; identification information comparison means that compares the identification information arranged in said transmission data region and the identification information set by said identification information setting means and obtains a result of the identification information comparison, the identification information being set by said identification information setting means when said stage of progress of the game program is cleared, when said game program is executed in said data receiver, and a reception control means that performs reception control of said transmission data based on said address information comparison result and said identification information comparison result.

14. The data transmission and reception system of claim 13, further comprising a reception control setting means that sets it so that said reception control means does reception control on the transmission data based only on the result of said address information comparison.

15. The data transmission and reception system of claim 13, wherein said address information is set to identification information that is unique to said data reception terminal that said data receiver uses for reception of transmission data that comes transmitted to its own address, and identification information indicating said transmission data consists of information that has no restrictions on a type thereof.

16. The data transmission and reception system of claim 13, wherein information of multiple types of different attributes is arranged in said identification information.

17. The data transmission and reception system of claim 13, wherein said groups have synchronization data for reading said transmission data and address information, and said receiver further comprising a synchronization means that synchronizes sad groups based on synchronization information in order to obtain the information that is arranged in said groups to which it belongs.

18. A data transmission and reception system of claim 13, wherein said groups in which said transmission data region, said address information region, and said selection call part are arranged and so which said synchronization information is added comprise transmission data frames of a wireless call system, and wherein said transmission data region serves as a message signal region.

* * * * *